US012190793B2

(12) United States Patent
Ma et al.

(10) Patent No.: US 12,190,793 B2
(45) Date of Patent: Jan. 7, 2025

(54) DISPLAY DEVICE AND DRIVER THEREOF

(71) Applicant: NOVATEK MICROELECTRONICS CORP., Taiwan (CN)

(72) Inventors: Yu-Sheng Ma, Taiwan (CN); Jhih-Siou Cheng, Taiwan (CN); Chun-Fu Lin, Taiwan (CN); Jin-Yi Lin, Taiwan (CN); Ju-Lin Huang, Taiwan (CN)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 18/205,199

(22) Filed: Jun. 2, 2023

(65) Prior Publication Data

US 2023/0306900 A1 Sep. 28, 2023

Related U.S. Application Data

(62) Division of application No. 17/242,807, filed on Apr. 28, 2021, now abandoned.

(60) Provisional application No. 63/017,179, filed on Apr. 29, 2020.

(51) Int. Cl.
*G09G 3/32* (2016.01)

(52) U.S. Cl.
CPC ........... *G09G 3/32* (2013.01); *G09G 2300/06* (2013.01); *G09G 2310/0248* (2013.01); *G09G 2310/0272* (2013.01); *G09G 2320/064* (2013.01); *G09G 2330/021* (2013.01)

(58) Field of Classification Search
CPC .......... G09G 3/22; G09G 3/32; G09G 3/3208; G09G 3/3216; G09G 3/3225; G09G 2320/064; G09G 2330/021; G09G 2300/06; G09G 2310/0248; G09G 2310/0272
USPC .................................................... 345/76, 619
See application file for complete search history.

(56) References Cited

U.S. PATENT DOCUMENTS 6,191,534 B1 * 2/2001 Schuler ................ G09G 3/3216 315/169.3
6,369,516 B1 4/2002 Iketsu et al.
7,253,665 B2 * 8/2007 Kimura .................... G09G 3/32 326/85
(Continued)

FOREIGN PATENT DOCUMENTS

CN 103596344 A 2/2014
CN 104183214 A 12/2014
(Continued)

*Primary Examiner* — Jason M Mandeville
(74) *Attorney, Agent, or Firm* — MARSHALL, GERSTEIN & BORUN LLP

(57) ABSTRACT

The present disclosure relates to a driver for driving a light emitting unit array of a display device, the driver including: a plurality of driving units, each of the plurality of driving units includes: a driving circuit configured to provide a driving current to a corresponding column of light emitting units in the light emitting unit array according to a pulse width modulation signal, during a turn-on period of a channel switch; a charge path circuit configured to be connected in parallel with the driving circuit, and to be turned on during the turn-on period of the channel switch to form a charge path; and a discharge path circuit configured to be connected in parallel with the driving circuit, and to be turned-on after the channel switch is turned off, to form a discharge path.

7 Claims, 5 Drawing Sheets

(56) References Cited

U.S. PATENT DOCUMENTS

| | | | | |
|---|---|---|---|---|
| 7,453,427 | B2 * | 11/2008 | Kimura | G09G 3/325 345/206 |
| 7,564,451 | B2 * | 7/2009 | Yang | G09G 3/3208 345/204 |
| 9,280,930 | B2 | 3/2016 | Somerville et al. | |
| 2003/0006713 | A1 | 1/2003 | Kim et al. | |
| 2004/0108983 | A1 | 6/2004 | Tseng et al. | |
| 2004/0233148 | A1 | 11/2004 | Tanghe et al. | |
| 2005/0264499 | A1 * | 12/2005 | Kim | G09G 3/3216 345/76 |
| 2011/0109537 | A1 | 5/2011 | Uguen et al. | |
| 2014/0132165 | A1 | 5/2014 | Lin et al. | |
| 2014/0159614 | A1 | 6/2014 | Hussain et al. | |
| 2017/0094740 | A1 | 3/2017 | Jung | |

FOREIGN PATENT DOCUMENTS

| | | | |
|---|---|---|---|
| CN | 105873306 | A | 8/2016 |
| CN | 108601169 | A | 9/2018 |
| CN | 105592605 | B | 11/2018 |
| CN | 110944424 | A | 3/2020 |
| CN | 111034359 | A | 4/2020 |
| TW | 201419245 | A | 5/2014 |

* cited by examiner

DISPLAY DEVICE AND DRIVER THEREOF

CROSS REFERENCE TO RELATED APPLICATION

This application is a divisional of U.S. application Ser. No. 17/242,807 filed on Apr. 28, 2021 which claims priority to U.S. provisional application No. 63/017,179 filed on Apr. 29, 2020, the entire contents of which are incorporated herein by reference.

TECHNICAL FIELD

The present disclosure relates to the field of integrated circuits. More specifically, the present disclosure relates to a display device including a light emitting unit array and a driver for driving the light emitting unit array of the display device.

BACKGROUND

In recent years, with the continuous development of display technology and the increasing requirements of consumers for the display resolution of electronic devices such as mobile phones and televisions, designers are required to integrate high-density light emitting unit arrays (e.g., LED) in a limited space. However, in high resolution applications, there are several problems in driving such light emitting unit arrays. For example, insufficient slew rate of the driver results in the inability to output a complete pulse, the coupling effect between channels results in the incorrect lighting behavior, or the slew rate of the driver is inconsistent under different coupling conditions, and so on. Therefore, it is desired in the art to provide an improved driver and a display device using the driver.

SUMMARY OF THE INVENTION

In view of above, the present disclosure provides a display device and a driver thereof, which can at least improve the output slew rate of the driver, and can dynamically adjust the improvement of the slew rate.

According to an aspect of the present disclosure, there is provided a driver for driving a light emitting unit array of a display device, the driver including a plurality of driving units, each of the plurality of driving units includes: a driving circuit configured to provide a driving current to a corresponding column of light emitting units in the light emitting unit array according to a pulse width modulation signal, during a turn on period of a channel switch; a regulating circuit configured to be connected in parallel with the driving circuit and be turned-on according to the pulse width modulation signal, to form a path with the corresponding column of the light emitting units, such that a current associated with the light emitting units flows through the path.

Further, according to an embodiment of the present disclosure, the regulating circuit includes a charge path circuit, and the charge path circuit is configured to be turned-on during the turn on period of the channel switch to form a charge path, and provide a charging current to the corresponding column of the light emitting units through the charge path.

Further, according to another embodiment of the present disclosure, each of the driving units further includes a mixed-signal controller coupled to the charge path circuit, and the mixed-signal controller is configured to control the turn-on of the charge path circuit according to an edge of the pulse width modulation signal; wherein the mixed-signal controller outputs a first control signal to the charge path circuit when a rising edge of the pulse width modulation signal is detected, to turn-on a first switching element of the charge path circuit so that the charge path circuit is turned-on.

Further, according to yet another embodiment of the present disclosure, the mixed-signal controller is further configured to receive a first instruction indicating a number of light emitting units to be driven, and adjust an intensity of turn-on of the charge path circuit according to the first instruction.

Further, according to yet another embodiment of the present disclosure, adjusting the intensity of turn-on of the charge path circuit includes: making a turn-on duration of the charge path circuit to be inversely proportional to the number of light emitting units to be driven indicated by the first instruction; or making a value of the charging current output by the charge path circuit to be inversely proportional to the number of light emitting units to be driven indicated by the first instruction; or making both the turn-on duration of the charge path circuit and the value of the charging current output by the charge path circuit to be inversely proportional to the number of light emitting units to be driven indicated by the first instruction.

Further, according to yet another embodiment of the present disclosure, the mixed-signal controller is further configured to receive a second instruction indicating that the display device enters a power saving mode, and set the intensity of turn-on of the charge path circuit to a fixed value according to the second instruction.

Further, according to yet another embodiment of the present disclosure, the mixed-signal controller is further configured to receive display data; generate the pulse width modulation signal and provide it to the driving circuit, wherein the pulse width of the generated pulse width modulation signal is based on the display data.

Further, according to yet another embodiment of the present disclosure, the regulating circuit includes a discharge path circuit, and the discharge path circuit is configured to be turned-on after the channel switch is turned off, to form a discharge path, so that the residual charges of the corresponding column of the light emitting units are discharged through the discharge path.

Further, according to yet another embodiment of the present disclosure, each of the driving units further includes a mixed-signal controller coupled to the discharge path circuit, and the mixed-signal controller is configured to control the turn-on of the discharge path circuit according to an edge of the pulse width modulation signal; wherein the mixed-signal controller output a second control signal to the discharge path circuit when a falling edge of the pulse width modulation signal is detected, to turn-on a second switching element of the discharge path circuit, so that the discharge path circuit is turned-on.

Further, according to yet another embodiment of the present disclosure, the mixed-signal controller is further configured to receive a third instruction indicating a number of light emitting units to be turned off, and adjust an intensity of turn-on of the discharge path circuit according to the third instruction.

Further, according to yet another embodiment of the present disclosure, adjusting the intensity of turn-on of the discharge path circuit includes: making a turn-on duration of the discharge path circuit to be inversely proportional to the number of light emitting units to be turned off indicated by the third instruction; or making a value of the discharged current flowing through the discharge path circuit to be inversely proportional to the number of light emitting units to be turned off indicated by the third instruction; or making both the turn-on duration of the discharge path circuit and the value of the discharged current flowing through the discharge path circuit to be inversely proportional to the number of light emitting units to be turned off indicated by the third instruction.

According to another aspect of the present disclosure, there is provided a driver for driving a light emitting unit array of a display device, the driver including a plurality of driving units, each of the plurality of driving units includes: a driving circuit configured to provide a driving current to a corresponding column of light emitting units in the light emitting unit array according to a pulse width modulation signal, during a turn on period of a channel switch; a charge path circuit configured to be connected in parallel with the driving circuit, and to be turned on during the turn on period of the channel switch to form a charge path, and to provide a charging current to the corresponding column of the light emitting units through the charge path; and a discharge path circuit configured to be connected in parallel with the driving circuit, and to be turned-on after the channel switch is turned off, to form a discharge path, so that the residual charges of the corresponding column of the light emitting units are discharged through the discharge path.

Further, according to an embodiment of the present disclosure, each of the driving units further includes a mixed-signal controller coupled to the charge path circuit and the discharge path circuit, and the mixed-signal controller is configured to control the turn-on of the charge path circuit and the discharge path circuit according to an edge of the pulse width modulation signal; wherein the mixed-signal controller output a first control signal to the charge path circuit when a rising edge of the pulse width modulation signal is detected, to turn-on a first switching element of the charge path circuit so that the charge path circuit is turned-on; and output a second control signal to the discharge path circuit when a falling edge of the pulse width modulation signal is detected, to turn-on a second switching element of the discharge path circuit so that the discharge path circuit is turned-on.

According to another aspect of the present disclosure, there is provided a display device, including: a light emitting array consisting of a plurality of light emitting units; a driver, each of the plurality of driving units in the driver is coupled to each column of the plurality of light emitting units to drive a corresponding column of the light emitting units; a scanning module coupled to each row of the plurality of light emitting units to provide a scanning signal to a corresponding row of the light emitting units.

Further, according to an embodiment of the present disclosure, the type of the display device is a mini-LED or a micro-LED.

According to the above mentioned display device and the driver thereof of the present disclosure, the response of the light emitting elements to the output of the driver or driving unit can be dynamically improved according to the load and coupling condition of the light emitting elements to be driven.

These and other objectives of the present disclosure will become obvious to those of ordinary skill in the art after reading the following detailed description of optional embodiments.

It is to be understood that both the foregoing general description and the following detailed description are exemplary, and are intended to provide further explanation of the disclosure as claimed.

BRIEF DESCRIPTION OF THE DRAWINGS

Through detailed description of the embodiments of the present disclosure in conjunction with the following drawings, the above and other objects, features, and advantages of the present disclosure will become clearer. It should be understood that these drawings are used to provide a further understanding of the embodiments of the present disclosure, and constitute a part of present specification, and are used to explain the present disclosure together with the embodiments of the present disclosure, and do not constitute a limitation of the present disclosure. In addition, in the drawings, the same reference numerals generally represent the same components or steps.

LIST OF REFERENCE SIGNS

400, 500, 600: Driving Unit
401, 501, 601: Driving Circuit
402, 502: Regulating Circuit
5021, 602: Charge Path Circuit
5022, 603: Discharge Path Circuit
604: Mixed-signal Controller
605: Controller
606: Interface
607: Memory

DETAILED DESCRIPTION

Examples are provided below to describe the present disclosure in detail, but the present disclosure is not limited to the provided embodiments, and the provided embodiments can be combined as appropriate. It should be understood that the embodiments described herein are only a part of the embodiments of the present disclosure, rather than all the embodiments of the present disclosure. These embodiments are merely illustrative and exemplary, and therefore should not be construed as limiting the scope of the present disclosure. In addition, in order to make the description clearer and concise, detailed descriptions of well-known functions and configurations in the art will be omitted, and repeated explanations of steps and elements will also be omitted.

Figure 1:
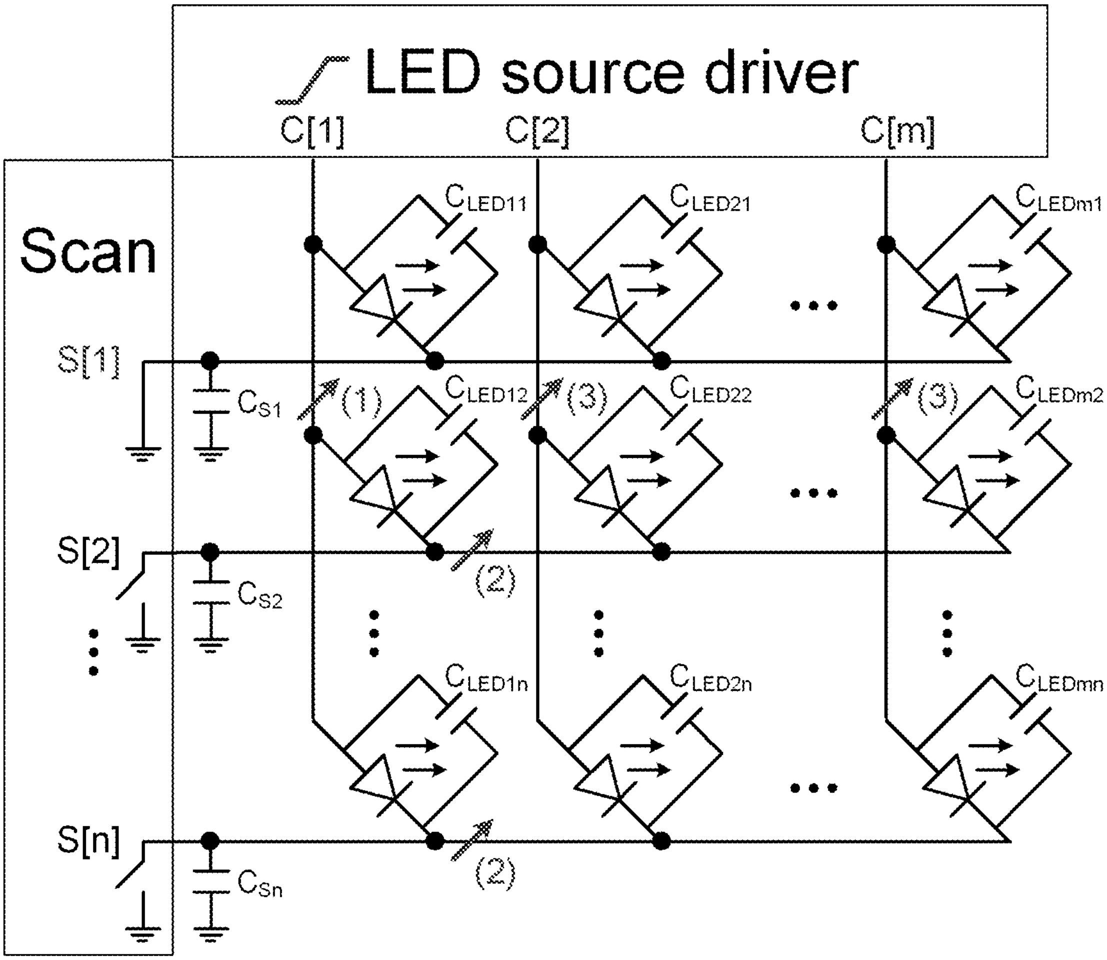
FIG. 1 is a schematic diagram showing a conventional driver and an LED array driven by the driver.

First, refer to FIG. 1, which shows a conventional driver and an LED array driven by the driver. In this embodiment, the LED array is the example of the light emitting unit array, which is composed of m columns and n rows of LEDs. Such a light emitting unit array can be used as a display panel of a display device or a part of a display panel. As shown in the FIG. 1, each row of the LEDs is connected to a scan line, and each column of the LED array is connected to the driver, so that the LED array is driven by the driver to emit light. For example, the conventional LED driver uses passive pulse width modulation (PWM) mode to drive the LEDs from top to bottom, i.e. S [1: n], row by row. However, driving any row of LEDs requires to charge n columns of load, i.e. CLED [m1: mn] at the same time. In addition, the driver may include a channel switch, and the channel switch is turned-on/turned-off to determine whether to provide a driving current to the corresponding one or more columns of LEDs. It can be understood that the driver in this example can drive the LEDs of each channel (column) as a whole, or it can include multiple driving units, and each driving unit can be used to drive corresponding one or more columns of light emitting units.

Further, according to an embodiment of the present disclosure, the LED driver as discussed herein can also be applied to a mini-LED or a micro-LED applications. Such LED applications are aimed at arraying and miniaturizing LEDs, for example, for the micro-LEDs, the size of a single LED unit is usually on the order of 50 microns or less, and it can be realized that each light emitting unit can be individually addressed and driven to emit light just like OLED. Since such LED applications have a smaller LED size, high resolutions such as 4K or even 8K can be more easily implemented in the screens of electronic devices.

Figure 2:
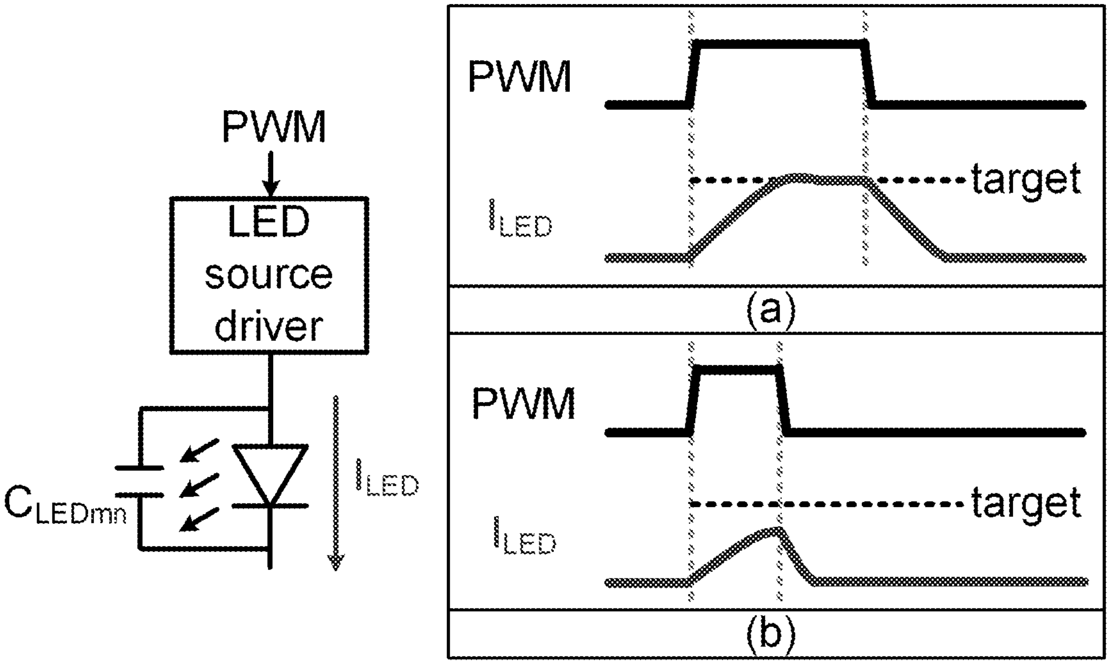
FIG. 2 is a schematic diagram showing a driving circuit and a waveform diagram associated with the driving circuit under different resolutions according to an embodiment of the present disclosure.

With further reference to FIG. 2, it shows a schematic diagram of a driving circuit and waveform diagrams associated with the driving circuit under different resolutions according to an embodiment of the present disclosure.

In the LED driving applications, for lower resolution applications, since the quantity of LED rows to be driven is small, the load is small, and the shortest pulse width of the corresponding PWM is long. Therefore, as shown in the waveform diagram (a) in FIG. 2, the slew rate limit of the driving current ICED output by the driving circuit is relatively low, that is, the PWM pulse width is long enough to enable the driving current ICED to rise to the target current value for driving the LEDs. However, in some high resolution applications, since the quantity of LED rows to be driven is large, the load is large, and the shortest pulse width of the corresponding PWM may be short. Therefore, as shown in the waveform diagram (b) in FIG. 2, the driving current ICED output by the driving circuit is insufficient to reach the target current value for driving the LEDs during the PWM pulse, which leads to a problem that the corresponding LEDs cannot be lit. For the sake of concision, only one driving unit and one LED unit in a corresponding column are shown in FIG. 2, but it is understood that the driving unit can drive multiple LEDs of multiple columns, and the above situation is also applicable.

In addition, due to the presence of capacitive elements in the LED array, there will be coupling between adjacent columns when the channel switch is turned-on. For example, as shown by the arrow in FIG. 1, when the channel switch in column C[1] is turned-on, it is coupled to other channels through the shown capacitor path (1)→(2)→(3). If the LED driver does not discharge the load after the channel is turned off, it may cause that the LEDs in the channel that has been turned off are erroneously lit due to coupling.

Figure 3:
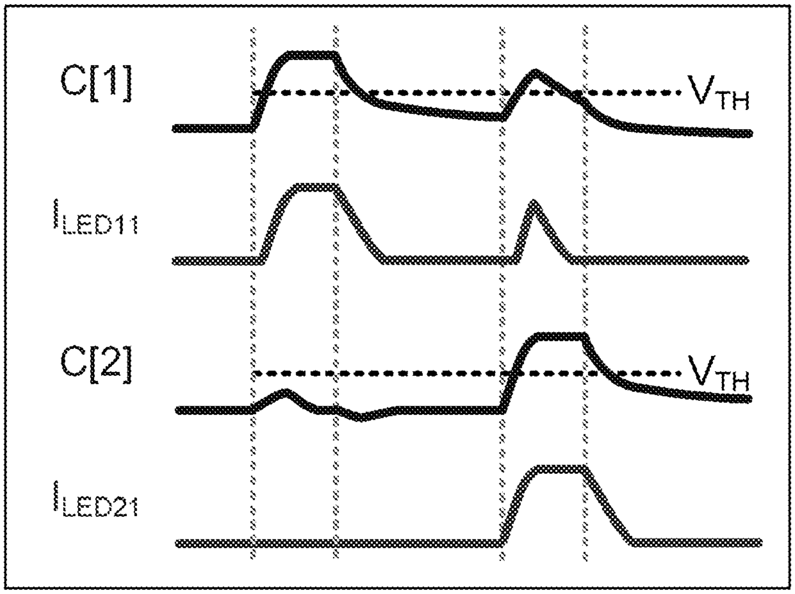
FIG. 3 is a waveform diagram associated with the driving unit under a coupling condition.

With further reference to FIG. 3, it shows a waveform diagram associated with the driving unit under a coupling condition. Still taking the LED array shown in FIG. 1 as an example, when the channel switch of column C[1] is switched from on to off, since the LEDs in this column are not discharged, the charges will remain in the capacitor in the column C[1], causing the potential of the LEDs in this column to be floating. When the channel switch of column C[2] is turned-on (at this time, the channel switch of column C[1] has been turned off), due to the capacitive coupling between the channels, the potential of column C[1] is coupled via C[2] channel. As shown in FIG. 3, the voltage of the C[1] channel rises above the threshold voltage VTH due to the coupling effect, and a current will flow through the LEDs in the corresponding column (i.e., $I_{LED11}$ fluctuates), causing the LED(s) in the C[1] channel that should be turned off to be erroneously lit.

First Embodiment

At least to solve the above mentioned problem that the LEDs cannot be lit, according to an embodiment of the present disclosure, a driver is provided to solve the above mentioned technical problem. In this embodiment, beneficial improvements will be made to the driving units in the driver, and the driving units in this embodiment will be described in detail below with reference to FIG. 4.

Figure 4:
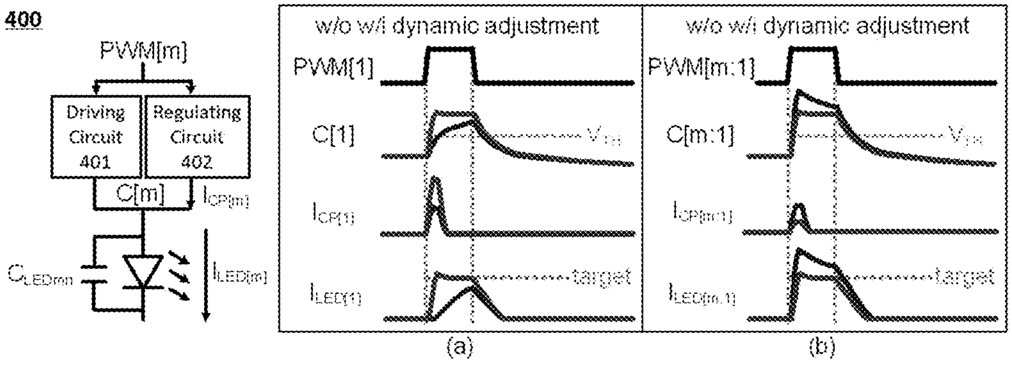
FIG. 4 is a diagram showing an example of a driving unit and a waveform diagram associated with the driving unit according to an embodiment of the present disclosure.

FIG. 4 shows an example of a driving unit and a waveform diagram associated with the driving unit according to an embodiment of the present disclosure. As shown in FIG. 4, the driving unit 400 includes a driving circuit 401 and a regulating circuit 402, and receives a PWM signal. The driving circuit 401 is configured to provide a driving current to the corresponding column(s) of the light emitting units (such as LEDs) in the light emitting unit array according to the received PWM signal, when the channel switch is turned-on; the regulating circuit 402 is configured to be connected in parallel with the driving circuit 401, and is turned-on according to the same received PWM signal, to connect the corresponding column(s) of the light emitting units and form a path, so that the current associated with the light emitting units flows through the formed path.

In order to improve the slew rate problem of the driving unit as described above, in this embodiment, the regulating circuit 402 will serve as a charge path circuit to provide a charge path to the LEDs of the corresponding column.

Specifically, taking the C[m] column in the LED array shown in FIG. 1 as an example, when the channel switch of the C[m] column is turned-on, the driving circuit 401 is connected to the corresponding column of LEDs to provide a driving current thereto; on the contrary, when the channel switch is turned off, the corresponding column of LEDs will not be provided with the driving current. In this way, the channel switch can control whether the light emitting units of the corresponding column is to be driven, and such the channel switch can be included in the driving unit 400, or may be provided separately from the driving unit 400. Therefore, as shown in FIG. 4, when the channel switch of the C[m] column is turned-on, the connection between the LEDs in the corresponding column of the LED array and the driving circuit 401 is turned-on, and the driving circuit 401 can provide a driving current $I_{DR}$ to the LEDs of the corresponding column according to the PWM signal, that is, the LEDs are driven in a pulse width modulation manner, which is a technical means known in the art, so detailed descriptions thereof are omitted here.

On the other hand, as shown in FIG. 4, the charge path circuit (regulating circuit 402) is connected in parallel with the driving circuit 401, and is turned-on during the turn on period of the channel switch to form a charge path, so that the charging current $I_{CP}$ is also provided to the LEDs of the corresponding column via this charge path. The charging current may be provided by a built-in current source or similar components of the charge path circuit, or provided by an external current source via the charge path circuit, as long as the charging current can be provided to the light emitting units in the corresponding column through the charge path formed by the charge path circuit. Therefore, the current flowing into the light emitting unit (for example, row n) $LED_{mn}$ in the C[m] column should be the sum of the driving current $I_{DR}$ output by the driving circuit and the charging current $I_{CP}$ flowing through the charge path circuit, which is expressed as: $I_{LED}=I_{DR}+I_{CP}$, as shown in the waveform diagram in FIG. 4, the charging current $I_{CP}$ can supplement the original driving current, which makes up for the output delay in the initial stage of the turn-on period of the channel, and improve the slew rate of the driving unit. Therefore, even if the PWM pulse width is short, the current supplied to the LEDs can be quickly increased to the target current value for driving the LEDs, thus realizing a short pulse width driving under a high resolution.

Second Embodiment

Figure 5:
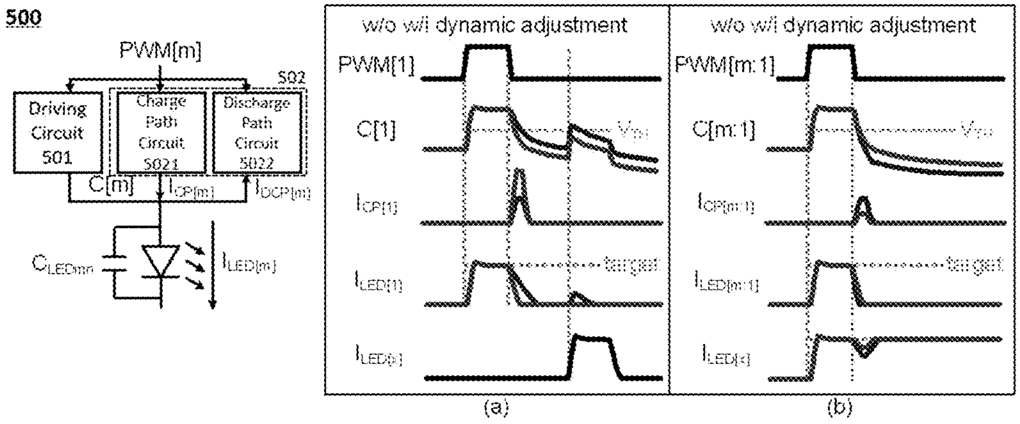
FIG. 5 is a diagram showing an example of a driving unit and a waveform diagram associated with the driving unit according to an embodiment of the present disclosure.

In addition, in order to at least solve the above mentioned problem of erroneously lighting of the LEDs, according to an embodiment of the present disclosure, a driver is provided to solve the above mentioned technical problem. The driving unit 500 in this embodiment will be described in detail below with reference to FIG. 5. In this embodiment, the driving unit is similar to the driving unit shown in FIG. 4, and compared with FIG. 4, the difference of FIG. 5 is that the adjusting circuit 502 included in the driving unit 500 not only includes a charge path circuit 5021, but also includes a discharge path circuit 5022 to provide a discharge path to the corresponding column of LEDs, thereby solving the above mentioned problem of erroneously lighting of the LEDs.

Specifically, still taking the LED array shown in FIG. 1 as an example, after the channel switch in column C[1] is switched from on to off, the LEDs in the corresponding column in the LED array are disconnected from the driving circuit. As shown in FIG. 5, the discharge path circuit 5022 connected in parallel with the driving circuit 501 is turned-on, to form a discharge path after the channel switch is turned off, so that the residual charges in the load in the column C[1] are discharged through the discharge path. For example, the discharge path circuit may be grounded, so that the residual charges flow to the ground via the discharge path formed by connecting the discharge path circuit, that is, after the channel switch is turned off, the discharging current $I_{DCP}$ flowing from the load of the corresponding column into the discharge circuit path is generated. In this way, after the channel switch of column C[1] is turned off, even if the channel switch of column C[2] is turned-on, the LEDs of the channels that have been turned off will not be erroneously lit due to the coupling effect.

The above embodiments respectively describe that the driving unit according to the embodiment of the present disclosure includes the driving circuit and the adjusting circuit, and as described above, the adjusting circuit can be used as a charge path circuit or a discharge path circuit to do improvements to the driver accordingly. Further, according to an embodiment of the present disclosure, the adjusting circuit included in the driving unit may only serve as one of the charge path circuit or the discharge path circuit, or may also integrate the function of the charge path circuit and the discharge path circuit both. Alternatively, the charge path circuit and the discharge path circuit may also be connected in parallel with the driving circuit as a separate element respectively, and the driving unit may include one or both of the charge path circuit and the discharge path circuit.

Third Embodiment

In addition, according to the third embodiment of the present disclosure, the driver further includes a mixed-signal controller, which is coupled to the regulating circuit described above in conjunction with FIGS. 4-5, and the mixed-signal controller is used to control the turn-on of the regulating circuit according to PWM.

Hereinafter, an optional embodiment according to the present disclosure will be described with reference to FIG. 6, which shows an overall diagram showing a driving system and an example of a driving unit according to an embodiment of the present disclosure. In this example, the driving system is composed of a driver, the LED array (as a part of the display device) driven by the driver, and an external controller. It should be understood that the driving system according to the present disclosure may also include other appropriate modules or units, which are not shown in this embodiment for concision. In addition, FIG. 6 also shows the specific structure of one driving unit 600 in the driver according to an embodiment of the present disclosure. In addition to a driving circuit 601, a charge path circuit 602, and a discharge path circuit 603 (which individually or collectively serve as a regulating circuit), the driving unit 600 also includes a mixed-signal controller 604.

Figure 6:
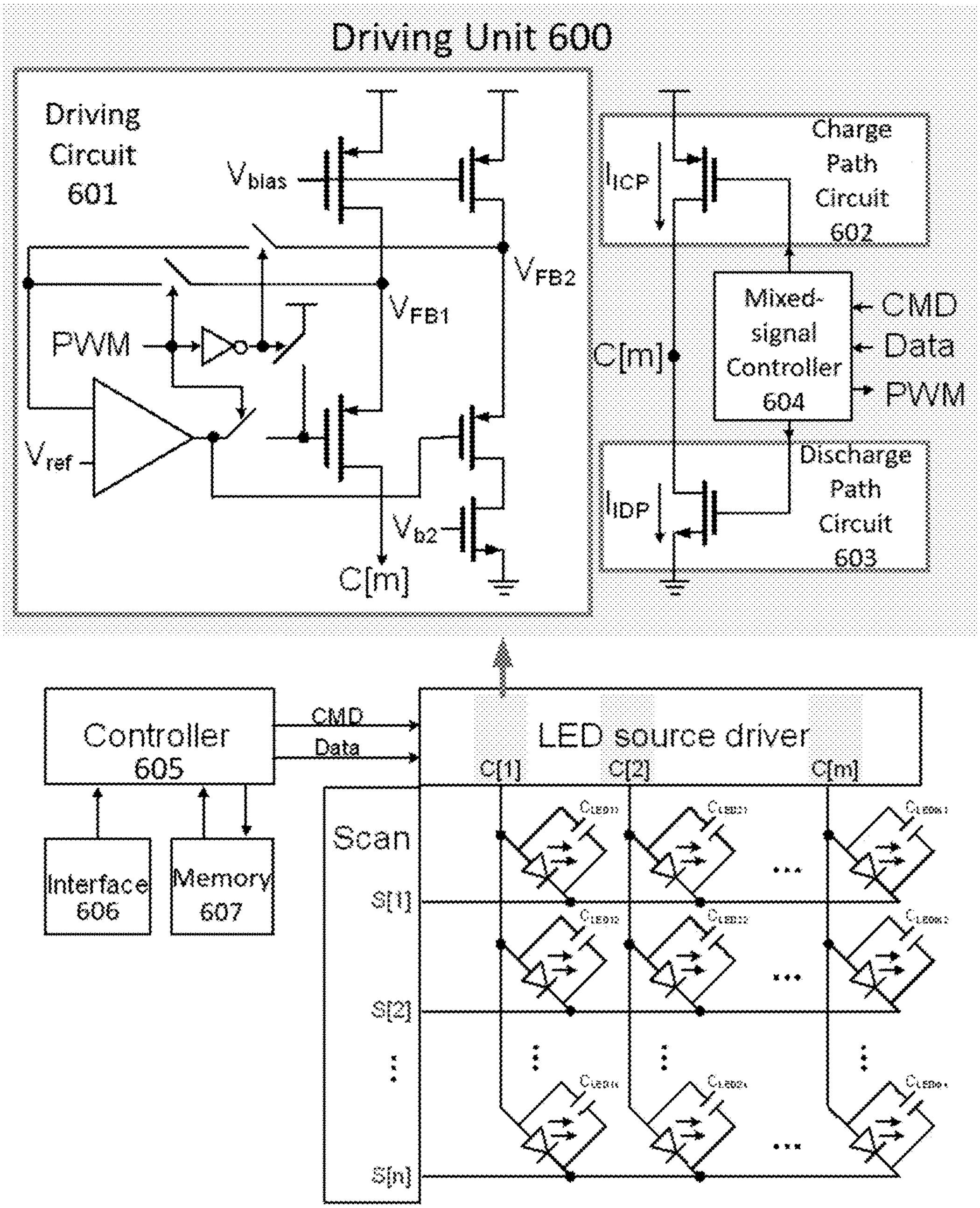
FIG. 6 is an overall diagram showing a driving system and an example of a driving unit according to an embodiment of the present disclosure.

As shown in FIG. 6, the mixed-signal controller 604 is coupled to the charge path circuit 602 and the discharge path circuit 603, and controls the turn-on of the charge path circuit 602 and the discharge path circuit 603 according to the edge of the pulse width modulation signal.

Optionally, the mixed-signal controller 604 is configured to output a first control signal to the charge path circuit 602, when a rising edge of the pulse width modulation signal is detected, to turn-on a first switching element of the charge path circuit so that the charge path circuit is turned-on. In this way, the turn-on timings of the charge path circuit and the channel switch can be basically synchronized, thereby rapidly raising the load potential, making up for the output delay in the initial driving stage, and achieving better response performance at high resolution. On the other hand, when the falling edge of the pulse width modulation signal is detected, the mixed-signal controller 604 is configured to output a second control signal to the discharge path circuit 603 to turn-on a second switching element of the discharge path circuit, so that the discharge path circuit is turned-on. In this way, the discharge path circuit can be turned-on immediately after the channel switch is turned off, so that the residual charges of the corresponding channel can be discharged in time, and thus avoiding erroneously lighting caused by the LED coupling with other channels.

According to various embodiments of the present disclosure, the first switching element and the second switching element in the charge path circuit and discharge path circuit may be implemented by one of the following elements: metal oxide semiconductor field effect transistor (MOSFET), diode, source follower and operational amplifier.

It should be understood that the foregoing embodiment is only an optional embodiment of the present disclosure, and the charge path circuit can also be turned-on within a period of time after the corresponding channel switch is turned-on, as long as it is turned-on during the turn-on period of the corresponding channel switch, the corresponding technical problem can be solved. It can also be understood that the discharge path circuit can also be turned-on within a period of time after the corresponding channel switch is turned off.

In addition, as described above, coupling between different channels will affect the slew rate of the driving unit. Besides that, the degree of coupling between the channels will be different depending on the number of channels to be turned-on at the same time. Hereinafter, this difference of the driving unit under different coupling conditions will be described in conjunction with FIG. 7.

Figure 7:
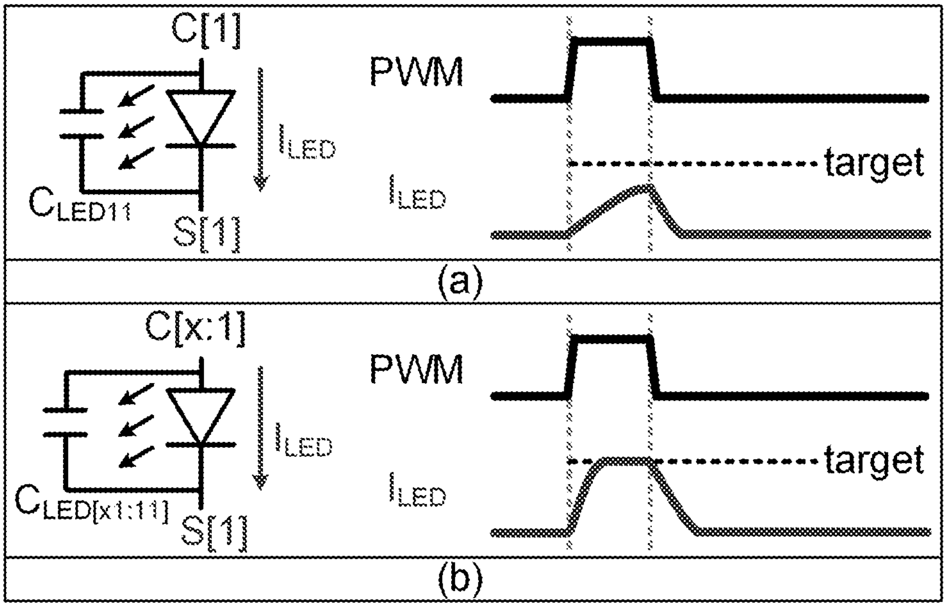
FIG. 7 is a schematic diagram showing a driving circuit and a waveform diagram associated with the driving circuit under different coupling conditions according to an embodiment of the present disclosure.

As shown in FIG. 7, when driving LEDs in any row S[n], depending on the number of channels C[x:1] that are turned-on at the same time, the slew rate of the driving unit will vary depending on the strength of coupling. For example, as shown in the waveform diagram (a) in FIG. 7, if a fewer number of channels are turned-on at the same time (that is, the number of LEDs to be driven is small) and the coupling between the capacitors is weak, the driving current rises slowly (i.e., the slew rate is slow), it may be difficult to drive the LEDs properly; on the contrary, as shown in the waveform diagram (b) in FIG. 7, if a larger number of channels are turned-on at the same time (that is, the number of LEDs to be driven is large) and the coupling between the capacitors is strong, the driving current rises faster (i.e., the slew rate is fast), and it may be easier to reach the current value required to drive the LEDs. Therefore, even for the same PWM pulse width, the requirements for the slew rate also vary with the number of light emitting units to be driven.

In view of the above, according to an embodiment of the present disclosure, the mixed-signal controller is further configured to receive a first instruction indicating a number of light emitting units to be driven and a third instruction indicating a number of light emitting units to be turned off from the controller; and adjust the intensity of turn-on of the charge path circuit according to the first instruction, and adjust the intensity of turn-on of the discharge path circuit according to the third instruction.

Specifically, as shown in FIG. 6, the controller 605 sends an instruction (shown as CMD in the figure) to the driver 600, and the controller 605 may be configured to determine to send a corresponding instruction to the driver 600 according to the data to be displayed, and then the instruction is received and processed by the mixed-signal controller 604 to control operations associated with the driver and/or the display device. For example, the instructions may indicate which light emitting unit(s) the driver is to drive/turn off, these instructions may be based on the user input via, for example, the user interface 606, or pre-stored in the memory 607 (such as RAM, ROM or similar storage media). Such a controller 605 may be located external to the driver or the display device, or may be integrated therein, and may be a general-purpose processor, DSP, CPU, microcontroller, ASIC, FPGA, programmable logic device, discrete gate or transistor logic component, discrete hardware components or the like. After the mixed-signal controller receives a first instruction indicating the number of light emitting units to be driven, it further adjusts the intensity of turn-on of the charge path circuit according to the first instruction.

According to an embodiment of the present disclosure, the instruction may be a first instruction indicating the number of light emitting units to be driven. Therefore, after the mixed-signal controller receives the first instruction, it can adjust the intensity of turn-on of the charge path depending on the number of light emitting units to be driven. For example, as shown in the waveform diagram (a) in FIG. 4, if the number of light emitting units to be driven is small, the slew rate of the driving unit is relatively slow, and therefore the intensity of turn-on of the charge path needs to be increased, as described above (for example, by increasing the turn-on duration of the charge path circuit or increasing the charging current), otherwise the current square wave used for driving the light emitting units may be incomplete; on the contrary, as shown in the waveform diagram (b) in FIG. 4, if the number of light emitting units to be driven is large, the slew rate of the driving unit is relatively fast, and the strength of the charge path circuit needs to be appropriately weakened, otherwise the current for driving the light emitting units may be overcharged (as shown by the darker line in the waveform diagram).

Optionally, according to an embodiment of the present disclosure, adjusting the intensity of turn-on of the charge path circuit includes: making the turn-on duration of the charge path circuit to be inversely proportional to the number of light emitting units to be driven indicated by the first instruction; alternatively, according to one embodiment of the present disclosure, adjusting the intensity of turn-on of the charge path circuit includes: making a value of the charging current output by the charge path circuit to be inversely proportional to the number of light emitting units to be driven indicated by the first instruction; alternatively, according to one embodiment of the present disclosure, adjusting the intensity of turn-on of the charge path circuit includes: making both of the turn-on duration of the charge path circuit and the value of the charging current output by the charge path circuit to be inversely proportional to the number of light emitting units to be driven indicated by the first instruction.

Also, the mixed-signal controller may receive a third instruction indicating a number of light emitting units to be turned-off from the controller. Furthermore, after the mixed-signal controller receives the third instruction indicating the number of light emitting units to be turned-off, it further adjusts the intensity of turn-on of the discharge path circuit according to the third instruction.

For example, as shown in the waveform diagram (a) in FIG. 5, if the number of channels that are turned off at the same time is small, the intensity of the discharging current needs to be increased, otherwise there will be too much residual charges remaining in the channels that have been turned off, which causes erroneously lighting due to the coupling of other channels; on the contrary, as shown in the waveform diagram (b) in FIG. 5, if the number of channels to be turned off at the same time is large, the intensity of turn-on of the discharge path circuit needs to be weakened, otherwise the slew rate of the driving unit will be too fast, which will couple with other channels and cause adverse effects.

Optionally, according to an embodiment of the present disclosure, adjusting the intensity of turn-on of the discharge path circuit includes: making the turn-on duration of the discharge path circuit to be inversely proportional to the number of light emitting units to be turned-off indicated by the third instruction; alternatively, according to one embodiment of the present disclosure, adjusting the intensity of turn-on of the discharge path circuit includes: making a value of the discharging current output by the discharge path circuit to be inversely proportional to the number of light emitting units to be turned-off indicated by the third instruction; alternatively, according to one embodiment of the present disclosure, adjusting the intensity of turn-on of the discharge path circuit includes: making both of the turn-on duration of the discharge path circuit and the value of the discharging current flowing through the discharge path circuit to be inversely proportional to the number of light emitting units to be turned-off indicated by the third instruction.

By use of above methods, the charge path circuit and the discharge path circuit are able to dynamically adjust the intensity of the charging current/discharging circuit according to the number of light emitting units to be driven/turned off, so that the slew rate of the driving unit has better consistency.

Further, according to another embodiment of the present disclosure, the mixed-signal controller is further configured to receive, e.g., from the controller, a second instruction indicating the display device enters a specific mode, and adjusting the intensity of turn-on of the charge/discharge path circuit to a fixed value according to the second instruction. Specifically, when the display device enters the specific mode (such as power saving mode), the controller directly sends a instruction for fixing to the mixed-signal controller, so that the mixed-signal controller does not need to determine the intensity of turn-on of the charge/discharge path circuit according to the number of light emitting units to be driven/turned off, but adjusts the intensity of turn-on of the regulating circuit (charge path circuit/discharge path circuit) to a fixed value. In addition, according to the display device enters into different modes, the mixed-signal controller may receive different instructions to adjust the intensity of turn-on of the regulating circuit to a corresponding value.

Further, the mixed-signal controller can also receive other instructions from the controller. For example, according to another embodiment of the present disclosure, the mixed-signal controller is further configured to receive, e.g., from the controller, display data, and generate the pulse width modulation signal and provide it to the driving circuit, wherein the pulse width of the generated pulse width modulation signal is determined based on the display data, namely, by adjusting the duty cycle of the PWM in one cycle, the driving circuit is able to drive the relevant light emitting units accordingly for different display data, so that the display device can present the display data correctly.

In addition, in various embodiments of the present disclosure, the mixed-signal controller may be coupled with an regulating unit that only serves as a charge path circuit, and configured to control the turn-on of the charge path circuit according to the edge of the pulse width modulation signal, or the mixed-signal controller may be coupled with an regulating unit that only serves as a discharge path circuit, and configured to control the turn-on of the discharge path circuit according to the edge of the pulse width modulation signal, or as described above, the mixed-signal controller can be coupled with both the charge path circuit and the discharge path circuit and configured to control the turn-on of the charge path circuit and discharge path circuit according to the edge of the pulse width modulation signal.

In addition, according to different design requirements, the controllers, the mixed-signal controllers and other modules described in the above mentioned embodiments of the present disclosure can be implemented in hardware, firmware, software or programs or a combination thereof.

In terms of hardware, the controllers, the mixed-signal controllers and other modules in the above embodiments can be implemented in logic circuits on integrated circuits. The related functions of the modules in the embodiments of the present disclosure may be implemented as hardware using hardware description languages (such as Verilog HDL or VHDL) or other suitable programming languages. For example, the related functions of the controller, the mixed-signal controller and other modules in the above mentioned embodiments can be implemented in one or more controllers, microcontrollers, microprocessors, and application-specific integrated circuits (ASIC), digital signal processor (DSP), Field Programmable Gate Array (FPGA) and/or various logic blocks, modules and circuits in other processing units.

In terms of software form and/or firmware, the related functions of the controller, mixed-signal controller and other modules in the above embodiments can be implemented as programming codes. For example, general programming languages (such as C, C++, or assembly language) or other suitable programming languages are used to implement the aforementioned modules of the embodiments of the present disclosure. The programming codes may be recorded/stored in a recording medium, which includes, for example, a read only memory (ROM), a storage device, and/or a random access memory (RAM). A computer, a central processing unit (CPU), a controller, a microcontroller, or a microprocessor can read and execute the programming codes from the recording medium, thereby achieving related functions. As the recording medium, a "non-transitory computer readable medium" can be used, for example, tape, disk, card, semiconductor memory, and programmable logic circuit and the like can be used. Moreover, the program may be provided to the computer (or CPU) via any transmission media (communication network, broadcast wave, etc.). The communication network includes, for example, the Internet, wired communication, wireless communication, or other communication media.

To sum up, in the embodiment of the present disclosure, the problem of slow slew rate of the existing driver and erroneously lighting of the light emitting units can be solved by providing the above mentioned regulating circuit in the driving unit, and the intensity of turn-on of the regulating circuit is dynamically adjusted according to the number of light emitting units to be driven, so that the driving unit has a relatively consistent slew rate, and thereby achieving a good driving performance in high resolution applications.

Although the present disclosure has been disclosed in the above embodiments, it is not intended to limit the present disclosure. Any person skilled in the art can make some changes and modifications without departing from the spirit and scope of the present disclosure. The protection scope of the present disclosure shall be subject to the scope defined by the claims.

What is claimed is:

1. A driver for driving a light emitting unit array of a display device, the driver including:

- a plurality of driving units, each of the plurality of driving units includes:
  - a driving circuit configured to provide a driving current to a corresponding column of light emitting units in the light emitting unit array according to a pulse width modulation signal, during a turn-on period of a channel switch;
  - a charge path circuit configured to be connected in parallel with the driving circuit, and to be turned on during the turn-on period of the channel switch to form a charge path, and provide a charging current to the corresponding column of the light emitting units through the charge path; and a discharge path circuit configured to be connected in parallel with the driving circuit, and to be turned-on after the channel switch is turned off, to form a discharge path, so that residual charges of the corresponding column of the light emitting units are discharged through the discharge path, wherein each of the driving units further includes a mixed-signal controller coupled to the charge path circuit and the discharge path circuit, and the mixed-signal controller configured to:

control the turn-on of the charge path circuit and the discharge path circuit according to a rising edge and a falling edge of a same pulse width modulation signal respectively; wherein output a first control signal to the charge path circuit when the rising edge of the pulse width modulation signal is detected, to turn-on a first switching element of the charge path circuit so that the charge path circuit is turned-on; and output a second control signal to the discharge path circuit, when the falling edge of the same pulse width modulation signal is detected, to turn-on a second switching element of the discharge path circuit so that the discharge path circuit is turned-on; and wherein discharging of the residual charges of the corresponding column of the light emitting units based on the pulse width modulation signal is performed after the charging current is provided to the light emitting units of the corresponding column based on the same pulse width modulation signal.

2. The driver according to claim 1, wherein the mixed-signal controller is further configured to:

receive a first instruction indicating a number of light emitting units to be driven and a third instruction indicating a number of light emitting units to be turned off, and adjust an intensity of turn-on of the charge path circuit according to the first instruction and adjust an intensity of turn-on of the discharge path circuit according to the third instruction.

3. The driver according to claim 2, wherein the adjusting the intensity of turn-on of the charge path circuit includes: making a turn-on duration of the charge path circuit and/or a value of the charging current output by the charge path circuit to be inversely proportional to the number of light emitting units to be driven indicated by the first instruction; and the adjusting the intensity of turn-on of the discharge path circuit includes: making a turn-on duration of the discharge path circuit and/or a value of the discharged current flowing through the discharge path circuit to be inversely proportional to the number of light emitting units to be turned off indicated by the third instruction.

4. The driver according to claim 1, wherein the mixed-signal controller is further configured to:

receive a second instruction indicating the display device enters a power saving mode, and set the intensity of turn-on of the charge path circuit/discharge path circuit to a fixed value according to the second instruction.

5. The driver according to claim 1, wherein the mixed-signal controller is further configured to:

receive display data; and generate the pulse width modulation signal and provide it to the driving circuit, wherein the pulse width of the generated pulse width modulation signal is based on the display data.

6. A display device, including:

a light emitting array consisting of a plurality of light emitting units;

the driver according to claim 1, each of the plurality of driving units in the driver is coupled to each column of the plurality of light emitting units to drive a corresponding column of the light emitting units; and a scanning module coupled to each row of the plurality of light emitting units to provide a scanning signal to a corresponding row of the light emitting units.

7. The display device according to claim 6, a type of the display device is a mini-LED or a micro-LED.

* * * * *